United States Patent Office 3,558,486
Patented Jan. 26, 1971

3,558,486
FIRE FIGHTING COMPOSITIONS WITH ASBESTOS THICKENING AGENT
William W. Morgenthaler, Maryland Heights, Mo., assignor to Monsanto Company, St. Louis, Mo., a corporation of Delaware
No Drawing. Filed May 6, 1968, Ser. No. 727,050
Int. Cl. C09k 3/28
U.S. Cl. 252—8.1      9 Claims

ABSTRACT OF THE DISCLOSURE

A fire retardant composition is disclosed which comprises from about 10% to about 50% of a particular type of asbestos and from about 50% to about 90% of a fire retardant salt, the weight ratio of the asbestos to salt being from about 1:1 to about 1:10. Aqueous mixtures containing specified levels of the fire retardant compositions have a suitable viscosity which enables the mixtures to impart effective fire retardancy to combustible objects when such mixtures are dropped from the air.

---

The present invention relates to improved aqueous mixtures of fire retardant salts and to compositions that are useful for the preparation of such aqueous solutions. More specifically, the present invention relates to compositions which form aqueous mixtures that are particularly useful for fighting forest, brush and grass fires.

One of the most valuable recent developments in the field of fire-fighting, particularly forest, brush and grass fire-fighting, is relating that to the use of aqueous solutions of fire-retardant salts. One preferred procedure for fighting such fires (particularly fires that are burning in relatively remote and/or inaccessible places) is by the use of air tanker planes which can drop the solutions on the trees and brush in the paths of the fires. If enough of the solution sticks to the individual twigs, bark, branches and leaves of the debris in the fire paths, the fire cannot penetrate these "treated" obstacles, and therefore dies for the lack of a suitably combustible fuel.

It is preferred that the aqueous solutions of fire-retardant salts that are effective for this use be made up "on site" at the air tanker bases, generally in relatively large batches. These batches are preferably prepared by simply dissolving a pre-blended mixture of an appropriate amount of the particular salt or mixture of salts desired, preferably with a dye or other coloring material, in a large tank containing the desired amount of water. Then the prepared solution is transferred via pumps and pipelines to the "drop" tank in an air tanker so that it can subsequently be dropped therefrom into the path of a fire.

A very recent development in this particular area of utility has been the use of material, known as thickening agents, which when used in the solutions modify the properties of these solutions, particularly the viscosity of the solutions, so that they have a significantly increased tendency to adhere to the individual plant and woody surfaces upon which they are dropped or applied, as compared to the solutions that do not contain such thickening agents. Since there is apparently a direct relationship between the ability of the treated materials to retard the passage of a fire and the amount of solution that actually adheres to the treated materials, there exists a strong need in the art for fire-fighting solutions that adhere strongly to the surfaces of the trees, brush and grass upon which the aqueous mixture containing the fire-retardant salts are dropped. The need is particularly acute when the fire-retardant materials are dropped from the air. Thus, while the salt solutions, per se, are extremely valuable fire-fighting materials, these solutions can be made even more effective and valuable through the use of certain thickening agents which modify the viscosity of the solution and cause the resulting aqueous mixture to adhere to the surfaces for a longer period of time. Various additives, many of which are known viscosity modifiers for water such as carboxymethylcellulose have been tried, however, these additives generally have had one or more of the shortcomings of high cost, a tendency to separate out of solution or inadequate viscosity modification.

Because fire-fighting fire-retardant aqueous mixtures should preferably be prepared on the site of the air tanker bases (for economic as well as practical reasons), one of the preferred properties of a suitable thickening agent is that it be effective when it is first intermixed with the "dry" salts and then the resulting mixture or blend is subsequently simply mixed with whatever water (often very hard) is available at the air tanker base. Also it is necessary that the solution does not segregate upon standing. Many materials that have the ability to aid in thickening the solutions either fail to thicken quickly or the aqueous mixture segregates upon standing. The desired thickening agent should also be compatible in the fire-fighting solutions with many other materials, such as corrosion inhibitors and the like, that are often utilized in these solutions.

In accordance with this invention it has been discovered that a fire-retardant composition comprising from about 50% to about 90% by weight of a fire-retardant salt of a class hereinafter defined and from about 10% to about 50% of a particular type of asbestos hereinafter described and having an asbestos to salt weight ratio of from about 1:1 to about 1:10, when mixed with water at levels of the composition of from about 7% to about 30% by weight of the total aqueous mixture, the mixture has the foregoing suitable viscosity and fire-retardant characteristics. It has further been discovered that other types of asbestos fibers having different characteristics fail to yield a composition having these improved viscosity characteristics.

Any natural occurring mineral which can be milled into fibers is generically known as asbestos. Different types of asbestos can be quite distinct mineralogically. For example, one group of compounds commonly known as the Amphibole group have the following empirical formulas:

| Formula: | Name |
|---|---|
| $Na_2O \cdot Fe_2O_3 \cdot 3FeO \cdot 8SiO_2 \cdot H_2O$ | Crocidolite. |
| $(FeMg)SiO_3 \cdot 1{-}5\% \; H_2O$ | Amosite. |
| $(MgFe)_7Si_8O_{22}(OH)_2$ | Anthophyllite. |
| $Ca_2Mg_5Si_8O_{22}(OH)_2$ | Tremolite. |
| $Ca_2(Mg,Fe)_5Si_8O_{22}(OH)_2$ | Actinolite. |

These fibers are generally straight, narrow solid strips and have been found to be unsuitable, that is, an aqueous mixture which is formed by adding the asbestos to an aqueous solution of the fire-retardant salts does not have suitable properties.

Chrysotile asbestos having the chemical formula, $Mg_6(OH)_8Si_4O_{10}$, and having certain physical characteristics has been found to impart a suitable viscosity to a solution of the fire-retardant's salts. The Chrysotile asbestos will be described more in detail hereinafter.

Aqueous fire-retardant salt solutions that can be effectively utilized for the prevention of forest fires are those that contain at least about 0.5 weight percent, and up to the level at about which the solutions are saturated therewith, but preferably between about 5 and about 25 weight percent, of dissolved salts selected from the group consisting of monoammonium orthophosphate, diammoium orthophosphate, monoammonium-alkali metal mixed orthophosphates, diammonium-alkali metal mixed orthophosphates, ammonium sulfate and mixtures thereof. Typical mixed cation salts include $NH_4MHPO_4$, $(NH_4)_2MPO_4$, and $NH_4M_2PO_4$, wherein M is an alkali metal cation; preferably sodium or potassium. Still further preferred are those aqueous fire-fighting solutions that contain from about 8 to about 20 weight percent of one or more of these salts dissolved therein.

The asbestos materials that can be advantageously utilized in the practice of this invention include an asbestos fiber having the empirical formula: $Mg_6(OH)_8Si_4O_{10}$ and having hollow fibers with a length below about 100 microns and a fiber diameter to fiber length ratio of from about 1:50 to about 1:3000. Preferred fiber lengths are below about 15 microns and a diameter to length ratio of from about 1:50 to about 1:300. The thickened aqueous mixtures contain levels of asbestos of from about 2% to 8% by weight and have viscosities of at least about 50 centipoises at about 25° C. The lower viscosity mixtures, that is, from about 50 to about 1000 centipoises are generally suitable for ground level applications. Aqueous mixture viscosities of at least about 1000 centipoises at about 25° C. are preferred for air drop mixtures. Generally the viscosity of these final fire-fighting solutions should not be so great that they cannot readily be pumped from the typical "make-up" tank (where the various solid components of the composition are dissolved in water, generally with agitation), or from a storage tank (in which the solutions are sometimes stored until the planes are ready to be loaded) to the drop tank in the air tanker. Thus, under most normal conditions of use, it is generally preferred that the viscosity of the final fire-fighting mixtures of this invention be at most about 3000 centipoises. Still further preferred are those having viscosities no higher than about 2000 centipoises. "Viscosities" of aqueous solutions, as described herein, are measured with a Brookfield viscometer using a No. 4 spindle at 60 r.p.m. at 25° C. unless otherwise stated.

The amount of the asbestos fibers that can be advantageously utilized in the final fire-fighting solutions of this invention varies from about 2.0% to about 10.0% by weight of the aqueous mixture and is preferably within the range of from about 3.0% to about 8.0% by weight based on the total weight of the aqueous fire-fighting mixture.

Although, the preferred procedures for preparing the final fire-fighting solutions of this invention involve simple mixing with agitation, of a mixture or blend of the varous "raw" solids (including the fire-retardant salt(s), the asbestos and any other necessary ingredients such as corrosion inhibitors, and the like in the relative proportions in which these "raw" solids appear in the final fire-fighting solutions) in the appropriate amount of water, these final solutions can actually be prepared in any manner that is convenient without detracting significantly from the benefits that can be gained in practicing this invention. For example, the particular fire-retardant salts that are utilized can first be dissolved in the water, with the asbestos being suspended therein subsequently, or the order of addition of these materials can readily be reversed or changed if desired. In most instances, however, a composition containing from about 10% to 50% by weight of the particular asbestos and from about 50% to about 90% by weight of fire-retardant salt having a weight ratio of from about 1:1 to about 1:10 are preferred because such compositions can be quickly mixed with water to yield the effective aqueous fire-fighting mixture.

The type of mixing used in preparing the thickened aqueous mixture of the salt solution and asbestos has a direct relationship to the viscosity of the resulting solution; for example, a viscosity in the range of 2,000 centipoises can be obtained with a low shear propeller type mixer at a 6% weight level of asbestos. If a high shear propeller type mixer is used, only 4% asbestos is required to achieve the same viscosity. Thus, the viscosity of the solution will vary from 50 to 2,000 centipoises when a low shear mixer is used as the percent asbestos varies from 3% to 6%. When a high shear mixer is used, the viscosity varies from about 1500 centipoises to about 3600 centipoises within the same range of percentages of asbestos. In most instances it is preferred to use a high shear blender and reduce the amount of asbestos fiber that is used to thicken the solution because the cost of asbestos is usually higher than the cost of the solution of fire-retardant salts. It is also to be noted that for some applications if a high shear mixer is used, a 2% asbestos solution will be satisfactory since a viscosity of about 700 centipoises can be achieved. The solutions thickened with asbestos tend to have a slight increase in viscosity upon standing. This viscosity increase, however, is not detrimental in most instances because the degree of increase is relatively slight. For example, the 4% asbestos solution when mixed with a high shear mixer has an initial viscosity of about 2000 centipoises; after 24 hours the viscosity increases to about 2100 centipoises. In most conventional equipment used this increase is not detrimental. In most instances the increase in viscosity is less when a high shear mixer is used rather than a low shear mixer.

In the following examples, which illustrates some of the preferred embodiments of the present invention, all parts are by weight unless otherwise specified.

EXAMPLE 1

Into a large conventional mixing vessel fitted with a low shear propeller mixer are charged about 10,000 parts of water. Then, while the water is being agitated, about 400 parts of an asbestos fiber having an average diameter of about 0.026 micron and a length to diameter ratio of about 200:1 with a maximum fiber length of about 10 microns and about 100 parts of 90 weight percent of technical grade diammonium orthophosphate crystals are poured into the mixing vessel over a period of about 2 minutes. The mixture of salts and water is then stirred for an additional 5 minutes. The resulting final diammonium orthophosphate fire-fighting solution has a viscosity of about 500 centipoises.

Additional aqueous solutions having the same relative proportions of water, diammonium phosphate and asbestos are prepared as given in Table I below.

| | Type of asbestos | Empirical formula |
|---|---|---|
| Solution: | | |
| 1 | Anthophyllite | $(MgFe)_7Si_8O_{22}(OH)_2$ |
| 2 | Amosite | $(FeMg)SiO_3 \cdot 1\text{-}5\% H_2O$ |
| 3 | Crocidolite | $Na_2O \cdot Fe_2O_3 \cdot 3FeO \cdot 8SiO_2 \cdot H_2O$ |

Results

Solution 1: Does not thicken to an appreciable extent. Unable to detect a change in viscosity in the mixture using a Brookfield viscometer. Essentially all of the asbestos fibers settles from the solution in about 10 minutes after agitation is discontinued.

Solution 2: Forms a grainy matted mass which separates upon standing to yield an aqueous layer on top and a sediment of asbestos on the bottom.

Solution 3: Forms a matter suspension which does not separate; the mat is loose and the solution readily runs from the matted suspension.

EXAMPLE 2

About 1000 parts of water are charged into a mixing vessel equipped with a high shear mixer. Over a period of about 5 minutes while the water is being stirred about 70 parts of technical grade diammonium orthophosphate are dissolved in the water. After the diammonium orthophosphate is completely dissolved, about 40 parts of an asbestos fiber having a hollow fiber having an average diameter of about 0.03 micron as determined by electron microscope images and a fiber length to fiber diameter ratio of about 300:1 are added over a period of about 5 minutes. The solution is thickened and a sample taken and is measured as having a viscosity of about 2000 centipoises by a Brookfield Viscometer. When the material is dropped from an airplane onto trees, no appreciable "run-off" of the thickened material is observed. Using essentially the same procedures and amounts of water and diammonium phosphates except 2%, 3%, 5% and 6% asbestos is added the viscosity varies from 600, 1100, 2700 and 3100, respectively. The choice of the viscosity will depend upon the degree of run-off that is acceptable. For example, if a slight amount of run-off can be tolerated, the lower viscosity solutions can be used; however, if a lower degree of run-off is required, for example, when trees are to be protected against potential fires rather than being dropped ahead of an existing fire, the higher viscosity mixtures are generally desired. The viscosities of the mixtures do not change appreciably with the amounts of diammonium phosphate normally employed, that is, a 10% diammonium orthophosphate solution is thickened to about the same viscosity as a 5% diammonium orthophosphate solution.

Using essentially the same procedure as above only a 20% by weight aqueous solution of ammonium sulfate results in an aqueous mixture having a viscosity of greater than about 500 centipoises at 25° C.

EXAMPLE 3

About 500 parts of monoammonium orthophosphate and about 125 parts of Chrysotile asbestos having a fiber length of below 100 microns and an average fiber length of about 80 microns and an average diameter to length ratio of about 1:50, are blended together in a conventional ribbon mixer to yield about 625 parts of a fire-retardant composition. The 625 parts of the fire-retardant composition are mixed with about 1500 parts of water using a high shear mixer. In about 5 minutes the viscosity of the resulting mixtures is raised to about 2000 centipoises. can be varied from 1:1 to about 1:10 and then the composition is mixed with water to yield aqueous mixtures containing from about 7% to about 15% by weight of fire-retardant compositions, the viscosity of the mixtures vary from about 50 centipoises at the lower levels to about 3000 centipoises at the higher levels. When ammonium sulfate is used as the fire-retardant salt, the preferred levels of ammonium sulfate in the aqueous mixture are generally from about 10% to about 20% whereas the preferred levels of ammonium phosphates in the aqueous mixture are generally from about 5% to about 15% by weight. Therefore, when either monoammonium orthophosphate or diammonium orthophosphate or mixtures thereof are used as the fire-retardant salts, the fire-retardant compositions preferably have a weight ratio of asbestos to salt from about 3:10 to about 8:10 whereas when ammonium sulfate is used as the fire-retardant salt, the preferred weight ratios of asbestos to salt are from about 3:20 to about 1:2.

What is claimed is:
1. A fire-retardant composition comprising from about 10% to about 50% of a Chrysotile asbestos fiber having the empirical formula: $Mg_6(OH)_8Si_4O_{10}$ and having hollow fibers with an average length below about 100 microns and a fiber diameter to fiber length ration of from about 1:50 to about 1:3000 and from about 50% to about 90% by weight of a fire-retardant salt selected from the group consisting of monoammonium orthophosphate, diammonium orthophosphate, monoammonium alkali metal mixed orthophosphates, diammonium alkali metal mixed orthophosphates, ammonium sulfate and mixtures thereof; the weight ratio of said asbestos to said fire-retardant salt being from about 1:1 to about 1:10.

2. A fire-retardant composition according to claim 1, wherein said fire-retardant salt is monoammonium orthophosphate and said ratio of asbestos to salt is from about 3:10 to about 8:10.

3. A fire-retardant composition according to claim 1, wherein said first-retardant salt is diammonium orthophosphate and said ratio of asbestos to salt is from about 3:10 to about 8:10.

4. A fire-retardant composition according to claim 1, wherein said fire-retardant salt is ammonium sulfate and said ratio of asbestos to salt is from about 3:20 to about 1:2.

5. An aqueous mixture contaning from about 7% to about 30% of a fire-retardant composition according to claim 1 and from about 70% to about 93% by weight of water wherein said mixture has a viscosity of from about 50 centipoises to about 3000 centipoises, the level of said asbestos being from about 2% to about 8% by weight of said aqueous mixture.

6. An aqueous mixture according to claim 5 wherein said fire-retardant salt is monoammonium orthophosphate and constitutes from about 5% to about 15% by weight of said mixture.

7. An aqueous mixture according to claim 5 wherein said fire-retardant salt is diammonium orthophosphate and constitutes from about 5% to about 15% by weight of said mixture.

8. An aqueous mixture according to claim 5 wherein said fire-retardant salt is ammonium sulfate and constitutes from about 10% to about 25% by weight of said mixture.

9. An aqueous mixture according to claim 5 wherein the viscosity of said mixture is from about 1000 to about 2000 centipoises.

References Cited

UNITED STATES PATENTS

| 100,632 | 3/1870 | Hyatt | 252—7 |
| 3,080,316 | 3/1963 | Petertyl et al. | 252—2 |
| 3,196,108 | 7/1965 | Nelson | 252—7 |
| 3,409,550 | 11/1968 | Gould | 252—2 |

FOREIGN PATENTS

| 494,598 | 10/1938 | Great Britain | 252—2 |

OTHER REFERENCES

Berger, Hans: Asbestos Fundamentals, Chemical Publishing Company, Inc., New York, 1963.

JOHN T. GOOLKASIAN, Primary Examiner

D. J. FRITSCH, Assistant Examiner

U.S. Cl. X.R.

252—2, 7; 117—138